United States Patent
Malmborg et al.

(10) Patent No.: US 8,840,373 B2
(45) Date of Patent: Sep. 23, 2014

(54) GAS TURBINE ENGINE ROTOR CONSTRUCTION

(75) Inventors: Eric W. Malmborg, Amston, CT (US); Matthew E. Bintz, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 576 days.

(21) Appl. No.: 13/197,482

(22) Filed: Aug. 3, 2011

(65) Prior Publication Data
US 2013/0034449 A1   Feb. 7, 2013

(51) Int. Cl.
*F01D 5/02* (2006.01)
*F01D 5/06* (2006.01)

(52) U.S. Cl.
CPC *F01D 5/06* (2013.01); *F01D 5/066* (2013.01); *F05D 2230/642* (2013.01); *F05D 2260/30* (2013.01); *Y02T 50/671* (2013.01); *F05D 2260/37* (2013.01)
USPC ................... 416/198 A; 416/214 A

(58) Field of Classification Search
USPC ...... 416/198 R, 201 R, 198 A, 204 R, 214 R, 416/214 A, 215, 218, 248
See application file for complete search history.

(56) References Cited

U.S. PATENT DOCUMENTS

| | | | |
|---|---|---|---|
| 5,232,339 A | 8/1993 | Plemmons et al. | |
| 5,361,580 A | 11/1994 | Ciokajlo et al. | |
| 7,309,210 B2 | 12/2007 | Suciu et al. | |
| 7,322,101 B2 | 1/2008 | Suciu et al. | |
| 7,811,053 B2 | 10/2010 | Balamucki et al. | |
| 7,836,596 B2 | 11/2010 | Suciu et al. | |
| 2010/0124495 A1* | 5/2010 | Bifulco | 415/216.1 |
| 2010/0158699 A1 | 6/2010 | Makuszewski | |
| 2010/0239424 A1 | 9/2010 | Maalouf et al. | |
| 2010/0266401 A1 | 10/2010 | Bintz et al. | |

* cited by examiner

*Primary Examiner* — Edward Look
*Assistant Examiner* — Juan G Flores
(74) *Attorney, Agent, or Firm* — O'Shea Getz P.C.

(57) ABSTRACT

A gas turbine rotor is provided with a longitudinal stack of blade supporting disks each including a medial web and a radially outer rim. The disks are spaced from one another by axial gaps. The disks include recesses in the forward and aft major surfaces thereof proximal to the juncture of the webs and rims thereof. Annular spacers received with the recesses in the disks span the axial gaps and provide a load path for the axial compressive preloading of the disks and the transmission of torque along the disk stack.

17 Claims, 1 Drawing Sheet

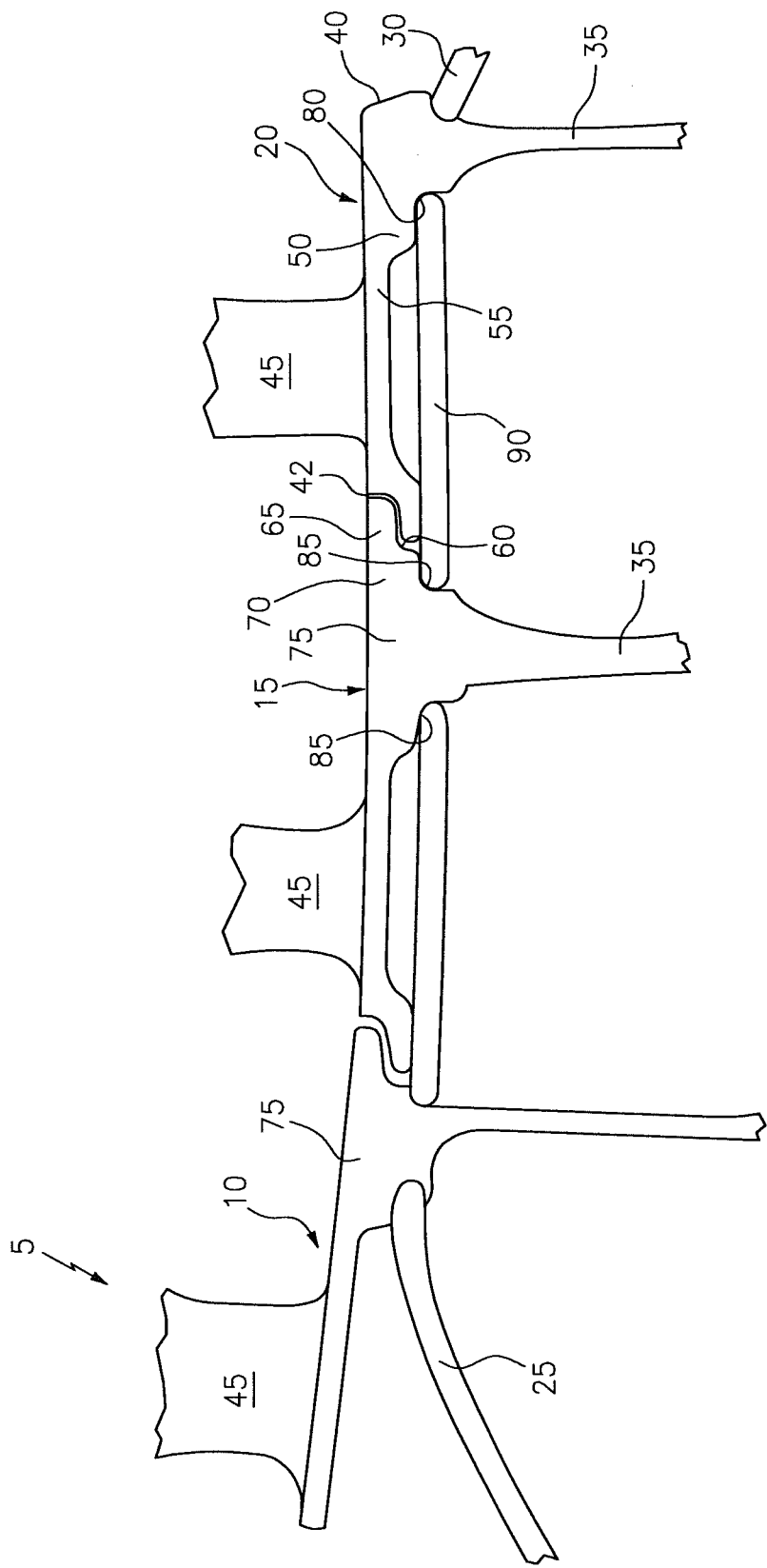

GAS TURBINE ENGINE ROTOR CONSTRUCTION

BACKGROUND OF THE INVENTION

1. Technical Field

This invention relates generally to gas turbine engines and particularly to a gas turbine engine rotor construction.

2. Background Information

Gas turbine engines, such as those which power aircraft and industrial equipment, employ a compressor to compress air which is drawn into the engine and a turbine to capture energy associated with the combustion of a fuel-air mixture which is exhausted from the engine's combustor. The compressor and turbine employ rotors which typically comprise a multiplicity of airfoil blades mounted on, or formed integrally into the rims of a plurality of disks. The compressor disks and blades are rotationally driven by rotation of the engine's turbine. It is a well-known prior art practice to arrange the disks in a longitudinally axial stack in compressive interengagement with one another which is maintained by a tie shaft which runs through aligned central bores in the disks. It is a common practice to arrange the disks so that they abut one another in the aforementioned axial stack along side edges of the disk rims The disk rims are exposed to working fluid flowing through the engine and therefore, are exposed to extreme heating from such working fluid. For example, in a gas turbine engine high pressure compressor, the rims of the disks are exposed to highly compressed air at highly elevated temperatures. The exposure of disk rims to such elevated temperatures, combined with repeated acceleration and deceleration of the disks resulting from the normal operation of the gas turbine engine at varying speeds and thrust levels may cause the disk rims to experience low cycle fatigue, creep and possibly cracking or other structural damage as a result thereof. This risk of structural damage is compounded by discontinuities inherent in the mounting of the blades on the rims. Such discontinuities may take the form of axial slots provided in the rims to accommodate the roots of the blades or, in the case of integrally bladed rotors wherein the blades are formed integrally with the disks, the integral attachment of the blades to the disks. Such discontinuities result in high mechanical stress concentrations at the locations thereof in the disks, which intensify the risks of structural damage to the disk rims resulting from the low cycle fatigue and creep collectively referred to as thermal-mechanical fatigue, experienced by the disks as noted hereinabove. Moreover, the high compressive forces along the edges of the disk rims due to the mutual abutment thereof in the aforementioned preloaded compressive retention of the disks in an axial stack, further exacerbates the risk of structural damage to the disk rims due to the aforementioned low cycle fatigue and creep.

Therefore, it will be appreciated that minimization of the risk of disk damage due to thermal-mechanical fatigue, and stress concentrations resulting from discontinuities in the disk rim is highly desirable.

SUMMARY OF THE DISCLOSURE

In accordance with the present invention, a gas turbine engine rotor comprising a plurality of blade supporting disks adapted for mounting on the rotor by longitudinally compressive preloaded retention in a longitudinal stack are separated from one another by axial gaps, adjacent disks having opposed upstream and downstream major surfaces thereof which include recesses therein proximal to a juncture of a medial web and end portions of the disks, the recesses receiving forward and aft end portions of annular spacers which span the gap between the adjacent disks and provide a path for the compressive preloading of the disks and the transmission of torque along the disk stack. The spacers allow the compressive preloading of the disks to be transmitted therebetween, radially inwardly of the disk rims so as not to exacerbate thermal-mechanical rim fatigue. The spacers also shield the disks from at least a portion of the destructive heating thereof by working fluid flowing through the engine.

BRIEF DESCRIPTION OF THE DRAWINGS

FIG. 1 is a side elevation of the gas turbine engine rotor of the present invention as employed in a compressor section of the gas turbine engine.

DETAILED DESCRIPTION OF THE INVENTION

Referring to FIG. 1, a gas turbine engine rotor 5 comprises a plurality of rotatable blade supporting disks 10, 15 and 20 which are disposed in a longitudinal stack within a hub, the forward and rear portions thereof being shown at 25 and 30. The forward and rear portion of the hub are mounted on a tie shaft (not shown) which urges the forward and rear portions of the hub toward each other thereby clamping the disks together with a suitable compressive preload to accommodate axial loading of the disks by working fluid flowing through the engine. As shown in FIG. 1, the disks comprise compressor disks, although the rotor structure of the present invention may be employed in other sections of the gas turbine engine such as a turbine section thereof Still referring to FIG. 1, the disks, as exemplified by disk 20, each include a medial web portion 35 and an annular rim 40 disposed at a radial outer portion of the web, adjacent disks being spaced from each other by gaps 42.

The disk rims are provided with integral airfoil blades 45 extending radially outwardly therefrom, although it will be appreciated that the invention herein may be employed with rotor disks having separate blades mounted thereon such as by accommodation of the blade roots within slots in the disk rims. Rim 40 includes a shoulder 50 at a forward portion thereof and a longitudinally forwardly extending first flange 55 in which blades 45 are integrally formed. A forward edge of flange 55 is received within an undercut 60 provided in a second flange 65 extending longitudinally rearwardly from a shoulder 70 of rim 75 of disk 15. It will be seen that the overlap of flanges 55 and 65 of disks 15 and 20 will shield the web portions of disks 15 and 20 from heat associated with the flow of working fluid past the outer edges of rims 40 and 75.

Radially inner surfaces of shoulders 50 and 70 of disks 20 and 15 respectively with the adjacent surfaces of the medial webs of disks 20 and 15 respectively define first and second recesses 80 and 85 respectively. Recesses 80 and 85 receive the longitudinally forward and aft edges of a cylindrically (or catenary shaped) annular spacer 90 in surface to surface contact with the recesses and spanning gap 42 between disks 15 and 20. Spacer 90 provides a path for the transmission of compressive preloading of disks 15 and 20, the gap between the disks ensuring that such compressive preloading of the disks through the spacers does not exacerbate the thermal-mechanical fatigue of the disk rims associated with heating thereof by working fluid passing thereover and internal stresses thereof due to normal rotational operation of the rotor.

As shown in FIG. 1, the configuration of the disks and spacers are repeated throughout the length of the longitudinal stack. Accordingly, it will be appreciated that the spacers which are disposed between the disks spanning the gaps therebetween will provide a secure path for the transmission of compressive preloading of the disks in the stack and the transmission of torque loading through the stack without requiring a compressive interengagement of the disk rims with one another which would otherwise exacerbate the thermal-mechanical fatigue of the rims associated with the heat of the working fluid flowing past the rims and the mechanical loading of the rims due to the rotation thereof. The uncomplicated shapes of the disks and spacers associated with the rotor construction of the present invention render implementation of this invention with relative ease in light weight and efficient gas turbine engine rotors.

While a specific embodiment of the present invention has been shown and described herein, it will be understood that various modification of this embodiment may suggest themselves to those skilled in the art. For example, while the gas turbine engine rotor construction of the present invention has been described within the context of a high pressure compressor rotor, it will be appreciated that the invention hereof may be equally well-suited for turbine rotors as well. Likewise, while the spacers employed between the rotor disks have been shown and described as being cylindrically annular, it will be appreciated that other shapes may be well-suited for different disk configurations. For example, where adjacent disks are of different radial dimension, conically annular spacers may be employed. Also, while the invention hereof has been described for use with gas turbine engine rotor disks having integral blades, it will be appreciated that the invention hereof may be employed with equal utility with other known arrangements of supporting airfoil blades on the disks such as accommodation of blade roots within slots formed within the disk rims Accordingly, it will be understood that these and various other modifications of the preferred embodiment of the present invention as illustrated and described herein may be implemented without departing from the present invention and is intended by the appended claims to cover these and any other such modifications which fall within the true spirit and scope of the invention herein.

Having thus described the invention, what is claimed is:

1. A gas turbine engine rotor adapted for rotation about a longitudinal axis thereof, comprising:
 a plurality of blade supporting disks mounted by longitudinally compressive preloaded retention in a longitudinal stack:
 a first disk comprising a medial web and an annular rim disposed at a radial outer portion of said medial web, said web having forward and aft surfaces which, with adjacent radially inner surfaces of said rim, define a pair of major surfaces of said first disk;
 a second disk adjacent said first disk and separated therefrom by a gap, said second disk comprising a medial web and an annular rim disposed at a radial outer portion of said medial web, said web having forward and aft surfaces which, with adjacent radially inner surfaces of said rim, define a pair of major surfaces of said second disk;
 said first disk including in a first major surface thereof, and a first recess;
 said second disk including in a first major surface thereof opposing said first major surface of said first disk, and a second recess; and
 a spacer having first and second ends received in said first and second recesses respectively of said first and second disks;
 said spacer spanning said gap and transmitting said compressive preloading from one of said first and second disks to the other of said first and second disks;
 wherein said first disk rim includes a first shoulder at an edge thereof and a first flange extending longitudinally from said first shoulder of said first disk toward said first major surface of said second disk.

2. The gas turbine engine rotor of claim 1, wherein said first and second disk rims include airfoil blades integral thereto and extending radially outwardly therefrom.

3. The gas turbine engine rotor of claim 2, wherein said first and second disks comprise compressor disks.

4. The gas turbine engine rotor of claim 1, wherein said first and second recesses in said first and second disks are annular.

5. The gas turbine engine rotor of claim 4, wherein said spacer is cylindrically annular.

6. The gas turbine engine rotor of claim 1, wherein said second disk rim includes a shoulder and a second flange extending longitudinally from said second disk rim shoulder toward said first major surface of said first disk.

7. The gas turbine engine rotor of claim 1, wherein said first and second disk rims longitudinally overlap to seal said first and second disk webs from radially inward leakage of working fluid flowing around said rotor.

8. The gas turbine engine rotor of claim 7, wherein said second flange is provided with an undercut and said first flange at an edge thereof is received within said undercut.

9. The gas turbine engine rotor of claim 1, wherein said first disk rim includes at an edge thereof, a shoulder having a radially inner surface, said first recess comprising a radially outer portion of said first major surface of said first disk web and said radially inner surface of said first disk rim shoulder.

10. The gas turbine engine rotor of claim 9, wherein said first end of said spacer includes a longitudinally outer edge in surface-to-surface contact with said radially outer portion of said first major surface of said first disk web.

11. The gas turbine engine rotor of claim 1, wherein said first flange includes an airfoil blade integral thereto and extending radially outwardly therefrom.

12. A gas turbine engine rotor, comprising:
 a longitudinally axial array of blade supporting disks spaced from one another by axial gaps,
 adjacent disks each including a medial web and a rim disposed at a radially outer portion of said web, said medial web and rim defining forward and aft major surfaces;
 each of said adjacent disks including a recess in at least one of said forward and aft major surfaces proximal to the juncture of said web and rim; and
 a spacer having a forward and aft end portion received within the recesses of said adjacent disks of said axial array thereof;
 said spacer spanning said gap between said adjacent disks and providing a path for compressively preloading said disks and the transmission of torque along said array of disk;
 wherein said disk rims each include a shoulder disposed at least one of the forward and aft edges of said rims, said shoulder including a radially inner surface, said recess comprising said radially inner surface of said shoulder and an adjacent radially outer portion of a corresponding disk web;
 wherein each of said disk rims is provided with a circumferential array of airfoil blades integral with said disk rim;
 wherein said rim shoulders include circumferential flanges extending longitudinally from said rim shoulders, said airfoil blades being integral with said flanges.

13. The gas turbine engine rotor of claim 12, wherein said disks are compressor disks.

14. The gas turbine engine rotor of claim 12, wherein said recesses are annular.

15. The gas turbine engine rotor of claim 14, wherein said spacers are annular.

16. The gas turbine engine rotor of claim 15, wherein said spacers are cylindrical.

17. A gas turbine engine rotor, comprising:
- a longitudinally axial array of blade supporting disks spaced from one another by axial gaps,
- adjacent disks each including a medial web and a rim disposed at a radially outer portion of said web, said medial web and rim defining forward and aft major surfaces;
- each of said adjacent disks including a recess in at least one of said forward and aft major surfaces proximal to the juncture of said web and rim; and
- a spacer having a forward and aft end portion received within the recesses of said adjacent disks of said axial array thereof;
- said spacer spanning said gap between said adjacent disks and providing a path for compressively preloading said disks and the transmission of torque along said array of disks;
- wherein said rims of adjacent disks overlap to seal the webs of said adjacent disks from radially inward leakage of working fluid flowing past said airfoil blades.

* * * * *